3,290,291
5-METHYL-3-(2'-CHLORO-3'-THIENYL)-4-ISOXA-ZOLYLPENICILLIN AND SALTS THEREOF
Leonard Bruce Crast, Jr., North Syracuse, N.Y., assignor to Bristol-Myers Company, New York, N.Y., a corporation of Delaware
No Drawing. Filed May 22, 1964, Ser. No. 369,626
2 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment of infectious diseases caused by Gram-positive bacteria and, more particularly relates to novel 5-(lower)alkyl-3-chlorothienyl-4-isoxazolylpenicillins and nontoxic, pharmaceutically acceptable salts thereof.

Antibacterial agents of the penicillin class have proven highly effective in the therapy of infections due to Gram-positive bacteria but nearly all such penicillins are ineffective against numerous so-called resistant strains of bacteria, e.g., benzylpenicillin-resistant strains of *Staphylococcus aureus* (*Micrococcus pyogenes* var. *aureus*). It is the object of the present invention to provide novel compounds which are effective against such resistant strains. It is a further object of the present invention to provide penicillins active against resistant staphylococci which are better absorbed orally than the penicillins of U.S. Patent 2,996,501.

The objects of the present invention have been achieved by the provision, according to the present invention, of a compound selected from the group consisting of an acid of the formula

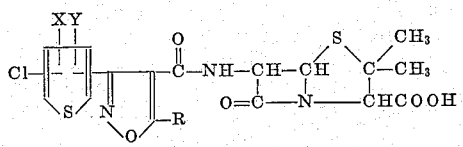

wherein X and Y each represent a member selected from the group consisting of chloro and hydrogen and wherein R represents (lower)alkyl; and nontoxic, pharmaceutically acceptable salts thereof.

The nontoxic, pharmaceutically acceptable salts include metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)alkylpiperidines, e.g., N-ethylpiperidine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Also included with the scope of the present invention are easily hydrolyzed esters and amides which are converted to the free acid form by chemical or enzymatic hydrolysis.

The preferred compounds of the present invention have the formulae

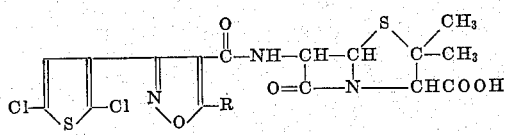

and

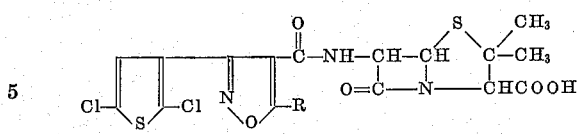

wherein R represents (lower)alkyl.

The products of the present invention are prepared by the reaction of 6-aminopenicillanic acid, preferably in the form of a neutral salt such as the sodium salt or the triethylamine salt, with an acid chloride having the formula

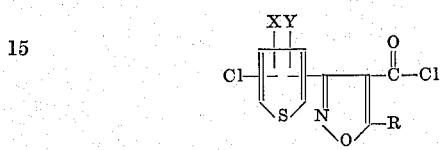

wherein R represents (lower)alkyl and X and Y each represent chloro or hydrogen, or its functional equivalent as an acylating agent for a primary amino group. Such equivalents include the corresponding carboxylic acid bromides, acid anhydrides and mixed anhydrides with other carboxylic acids, including monoesters and particularly lower aliphatic esters, of carbonic acid. In addition, an acid azide or an active ester or thioester (e.g., with p-nitrophenol, thiophenol, thioacetic acid) may be used or the free acid itself may be coupled with 6-aminopenicillanic acid by the use of enzymes or of a carbodiimide reagent [cf. Sheehan and Hess, J. Amer. Chem. Soc., 77, 1067, (1955)]. Another equivalent of the acid chloride is a corresponding azolide, i.e., an amide of the corresponding acid whose amide nitrogen is a member of a quasi-aromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated but this is not essential. The methods for carrying out these reactions to produce a penicillin and the methods used to isolate the penicillins so produced are well-known in the art.

The novel 5-(lower)alkyl-3-mono- or poly-chlorothienyl-isoxazole-4-carboxylic acids used to produce the compounds of the present invention are prepared from mono-, di- and tri-chloro-thiophenealdehydes by the procedures used previously to prepare 5-(lower)alkyl-3-phenyl-isoxazole-4-carboxylic acids from benzaldehyde as reported in the literature, e.g., in U.S. Patent 2,996,501 and references therein. The preparation of these aldehydes and their conversion to the acids used to prepare the penicillins of the present invention is accomplished as reported in the literature or by the use of methods reported therein for similar compounds and preferably by one of the three general stepwise processes outlined below in terms of the three preferred embodiments of the present invention, thus:

PROCEDURE 1

(a) 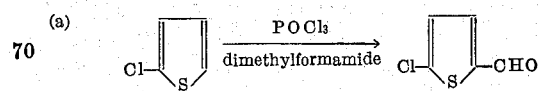

(b)

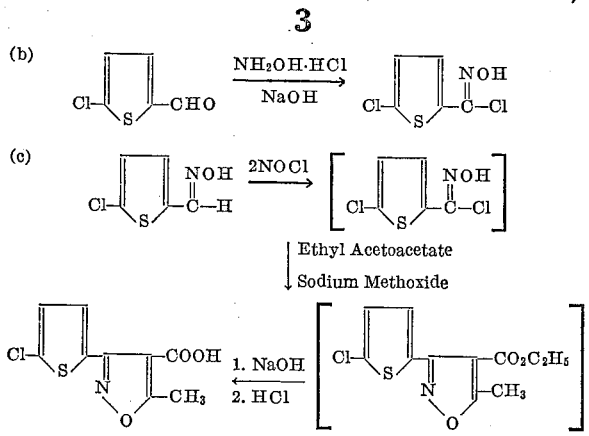

Step (a)—See C.A. 57, 3387f and references therein.
Step (b)—See C.A. 55, 4471i and references therein.
Step (c)—See U.S. Patent 2,996,501 and references therein.

PROCEDURE 2

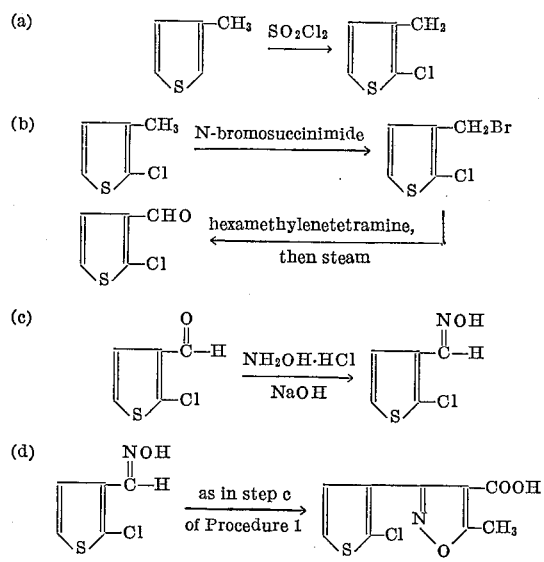

Step (a)—See J. Amer. Chem. Soc. 70, 415ff (1948) and references therein.
Step (b)—See J. Amer. Chem. Soc. 71, 333–335 (1949) and references therein.

PROCEDURE 3

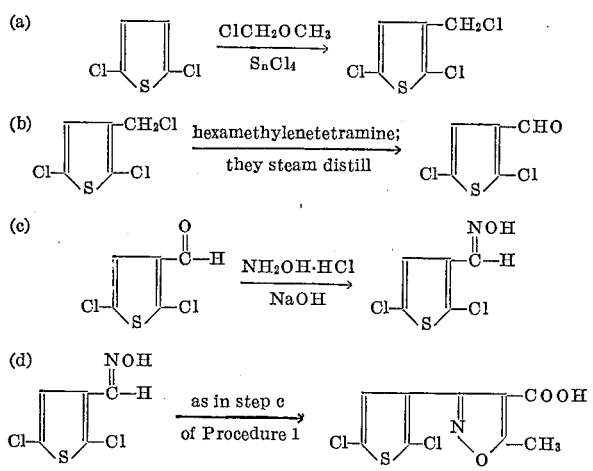

Step (a)—See C.A. 51, 1935d and Arkiv. Kemi 8, 441–8 (1955) and references therein.

Additional methods of preparation of thiophenealdehydes (also called thiophenecarboxaldehyes) are disclosed, for example, on pages 230–232 of volume 1 of Heterocyclic Compounds, R. C. Elderfield, John Wiley & Sons, Inc., New York, 1950, and on pages 217–219 of volume IV, Part A, of Chemistry of Carbon Compounds, E. H. Rodd, Elsevier Publishing Company, New York, 1957 and in Chemical Abstracts, 46, P9610h; 47, P2215a; 49, 3933h; 50, P16869f; 44, P2565e; 43, 2986i; 32, 3392⁴; 55, 1568c; 57, 16527i; and 57, 16529e and in the references therein.

The following examples will serve to illustrate this invention without limiting it thereto.

*Example 1*

(a)

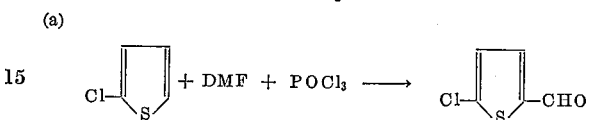

*Procedure.*—$POCl_3$ (229.5 g.) was added slowly to dimethylformamide (DMF, 219 g.) at or below 40° C. followed by 177.85 g. 2-chlorothiophene (Michigan Chemical Corp.). The stirred mixture was slowly heated to 100° C. and kept there 20 hours. At first an exothermic reaction took place and during the first hour the heat was removed several times to prevent overheating. The black oil was cooled and poured into 3 liters of ice and water with stirring. Three 1-liter extracts were taken, combined and washed three times with 500 ml. distilled water and finally dried over $Na_2SO_4$. The product boiled at 92°/13–10 mm. Hg, yield 151 g.

(b)

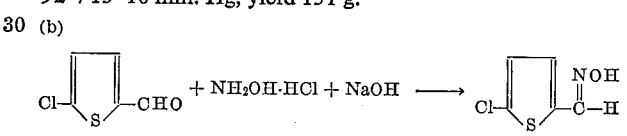

*Procedure.*—To a stirred slurry of 147.6 g. (1 mole) of 5-chloro-2-thiophenecarboxaldehyde in 500 ml. of water at 60° C., was added, all at once, 40 g. (1 mole) of sodium hydroxide in 50 ml. of $H_2O$ followed by 69.5 g. (1 mole) of hydroxylamine hydrochloride in 100 ml. of $H_2O$. The vigorously stirred slurry was kept at 60° C. for 30 minutes, cooled to 20° C., filtered, washed with water and dried. The crystalline product was recrystallized from petroleum ether (Skellysolve B) to give 120 g. of white product, M.P. 120–125° C.

(c) 3 - (5' - chloro - 2' - thiophene) - 5 - methyl - 4 - isoxazolecarboxylic acid

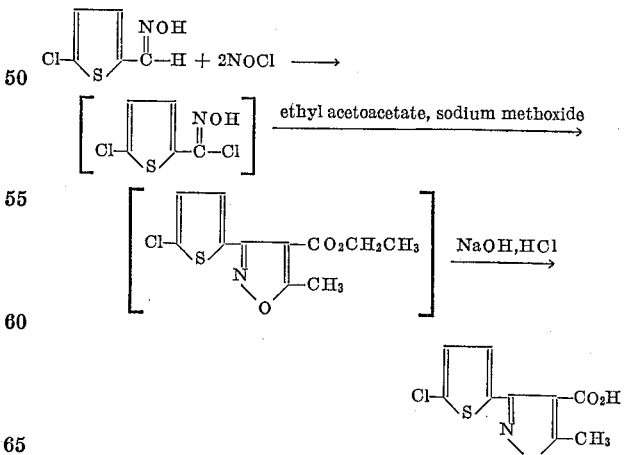

*Procedure.*—To a stirred solution of 80.8 g. (0.5 mole) of the 5-chloro-2-thiophenecarboxaldoxime in 400 ml. of dry ether was added 65.5 g. (1 mole) of nitrosyl chloride in 600 ml. of dry ether over a period of 15 minutes at 0° C. One hour after the addition the temperature was allowed to rise to 20° C. over a 2-hour period. The ether was then removed in vacuo and the resulting light yellow crystalline residue was immediately dissolved in 200 ml. of ice cold methanol and added rapidly to a vigorously stirred solution of 65 g. (0.5 mole) and ethyl acetoacetate and 27 g. (0.5 mole) of sodium methoxide in 300 ml. of methanol at −10° C. When the initial exothermic reaction was over, the Dry Ice-acetone bath was removed and stirring continued until room temperature was reached (22° C.). The resulting slurry was refluxed one-half hour, cooled, filtered and 25 g. of NaOH in 25 ml. of water added to the filtrate. The basic filtrate was now refluxed two hours and the methanol removed in vacuo. The residue was shaken with 500 ml. of water and 500 ml. of ether. The aqueous phase was stripped of residual ether and acidified slowly in an ice bath to pH 2. The dark oil which separated was dissolved in 300 ml. of warm 1:1 ethanol-water and filtered. Upon scratching and cooling, there was obtained 45 g. of tan-yellow crystals, M.P. 157–158° C. A second crop of 3 g. was obtained and recrystallized twice from methanol-water to give 2.4 g., M.P. 158–159° C. (40% yield).

*Analysis.*—Calcd.: C, 44.4; H, 2.48; N, 5.74. Found: C, 44.75; H, 2.42; N, 5.68.

(d) sodium 6 - [3 - (5' - chloro - 2' - thiophene) - 5-methyl-4-isoxazolecarboxamido]penicillanate

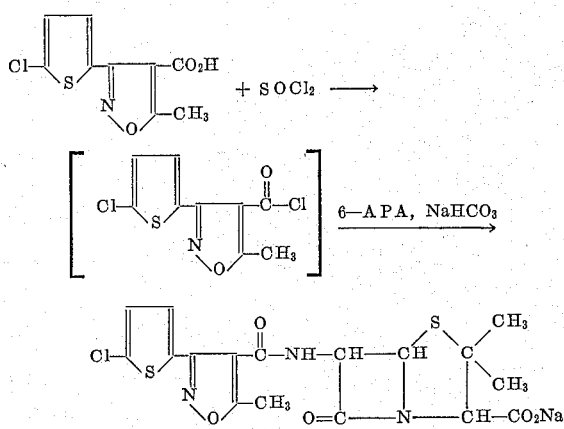

*Procedure.*—The 45 g. (.18 mole) of acid from "(c)" was warmed with 100 ml. of SOCl₂ for one hour at 30–40° C. and then the excess SOCl₂ was removed in vacuo. The crude acid chloride was immediately dissolved in 250 ml. of acetone and added, all at once, to a previously prepared and vigorously stirred solution of 43.2 g. (0.2 mole) of 6-aminopenicillanic (6–APA), 84 g. (1 mole) of sodium bicarbonate, 500 ml. of water and 250 ml. of acetone at 10° C. The temperature was maintained at 10° C. for 15 minutes and then the ice bath was removed. One hour later 500 ml. of water was added and the mixture extracted with two 500 ml. portions of methyl isobutyl ketone (MIBK). The aqueous phase was then layered with 500 ml. of MIBK and acidified with cooling and stirring to pH 2. The MIBK extract was then washed with two 300 ml. portions of water and finally with a solution of NaHCO₃ (10 g. in 400 ml. of water). The bicarbonate extract was then treated with a solution of 18 g. DEB acetate (N,N'-dibenzylethylenediamine diacetate) in 300 ml. of water. The DEB salt crystallized immediately and was filtered, washed with water and air dried. The crude DEB salt was recrystallized by dissolving it in 700 ml. of methanol, filtering and adding water to the cloud point. After seeding and cooling there was obtained 56 g. (50% of theory) of pure DEB salt.

*Analysis.*—Calcd.: C, 53.3; H, 4.66; N, 9.97. Found: C, 53.9; H, 5.11; N, 9.61. Vol. loss 4.95%.

Fifty-three grams of this DEB salt was shaken with 500 ml. of ethyl acetate and 500 ml. of 5% H₃PO₄ aqueous solution until all had dissolved. The ethyl acetate layer was washed with water (2 x 300 ml. portions), dried one hour over Na₂SO₄, filtered and treated with 50 ml. of 40% sodium 2-ethylhexanoate in n-butanol. The ethyl acetate was removed in vacuo and the residue triturated with a liter of dry ether. The resulting white solid was filtered off and dried over P₂O₅ under vacuum. The yield of sodium salt was 30 g. Decomposes at 120° C.

*Analysis.*—Calcd.: C, 44.1; H, 3.26; N, 9.08. Found: C, 45.9; H, 3.86; N, 8.38.

The sodium 6-[3-(5'-chloro-2'-thienyl)-5-methylisoxazole-4-carboxamido]penicillanate thus produced, which may also be named sodium 5-methyl-3-(5'-chloro-2'-thienyl)-4-isoxazolyl-penicillin, was found to contain the β-lactam structure as shown by infrared analysis, to inhibit *Staph. aureus* Smith at a concentration of 0.062 to 0.125 mcg./ml. and to inhibit the benzylpenicillin-resistant *Staph. aureus* BX–1633–2 at 0.8 mcg./ml. and to inhibit the benzylpenicillin-resistant *Staph. aureus* 52–75 at 0.8–1.6 mcg./ml. This penicillin is very efficiently absorbed on oral administration to man and animals.

*Example 2*

(a) 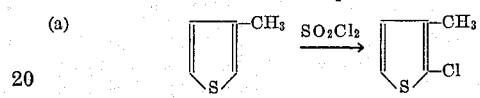

*Procedure.*—To one pound (about 4.5 moles) of 3-methylthiophene (Winthrop) was added dropwise 607 g. (about 4.7 moles) of SO₂Cl₂ (Hooker). The temperature rose gradually during the addition and when about one-quarter of the SO₂Cl₂ had been added the solution began to reflux and the rate of addition was set to maintain reflux. The addition took one hour and heat was applied after the addition for 30 minutes to complete the reaction. The yield was 450 g., B.P. 153–157° C. (main fraction B.P. 156–157° C.).

(b) 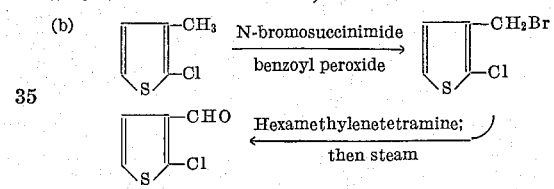

*Procedure.*—A solution of 380 g. (2.88 mole) of 2-chloro-3-methylthiophene in 750 ml. CCl₄ was mixed with 513 g. (2.88 mole) of N-bromosuccinimide and 5 g. benzoyl peroxide and when refluxing started the heating mantle was removed and the reaction kept refluxing for 30 minutes under its own heat of reaction. After the spontaneous refluxing subsided, heat was cautiously applied for 3 hours to reflux. Then the slurry was cooled, filtered and the succinimide was washed with a little CCl₄ (3 x 100 ml.). The combined filtrates were vigorously stirred while two liters of CHCl₃ was added, followed by 403 g. (2.88 mole) of hexamethylenetetramine. The slurry was stirred vigorously for 3 hours at reflux, cooled and filtered, washed with CHCl₃ and air dried. The entire amount was steam distilled with 2.5 liters water and the first six liters of distillate were acidified to pH 2 with 6 N HCl, extracted three times with ether and then dried over Na₂SO₄. The product, 2-chloro-3-thiophenecarboxaldehyde, distilled at 65° C./0.1 mm. Hg and solidified on standing (120 g.).

(c) 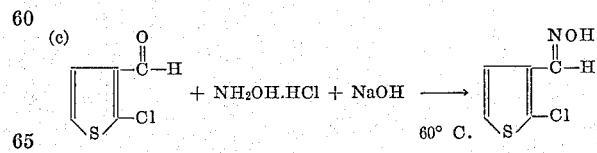

*Procedure.*—One hundred and twenty grams of 2-chloro-3-thiophenecarboxaldehyde (0.822 mole) and 500 ml. of water were warmed to 60° C. with vigorous stirring while 32.9 g. (0.822 mole) of sodium hydroxide in 100 ml. of water was added all at once followed by 56.7 g. (0.822 mole) of hydroxylamine hydrochloride in 200 ml. of water all at once. The vigorously stirred slurry was kept at 60° C. for 30 minutes, cooled, filtered, washed with water and air dried. The crude oxime was recrystallized from benzene-"Skellysolve B" (petroleum ether, B.P. 40–60° C.). Yield was 110 g. (80%), (M.P. 105–110° C.).

(d) 3-(2'-choro-3'-thiophene)-5-methyl-4 - isoxazolecarboxylic acid

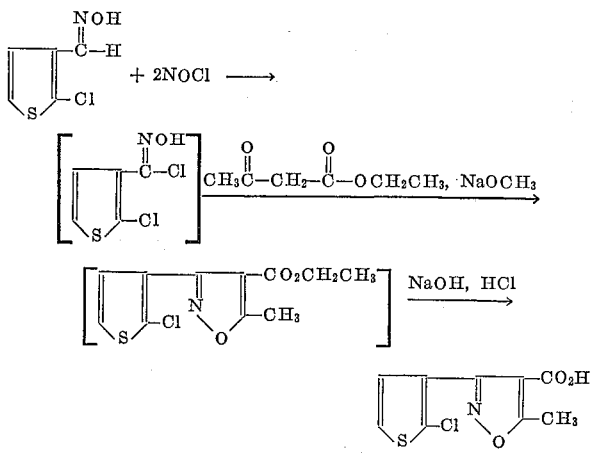

*Procedure.*—Using exactly the same amounts and experimental conditions as in Example 1 "(c)," there was obtained 30 g. of recrystallized ($CH_3OH$—$H_2O$) material, M.P. 147–148° C.

*Analysis.*—Calcd.: C, 44.4; H, 2.48; N, 5.74. Found: C, 44.25; H, 2.68; N, 5.97.

(e) Sodium 6 - [3-(2'-chloro-3'-thiophene)-5-methyl-4-isoxazolecarboxamido]penicillanate monohydrate.

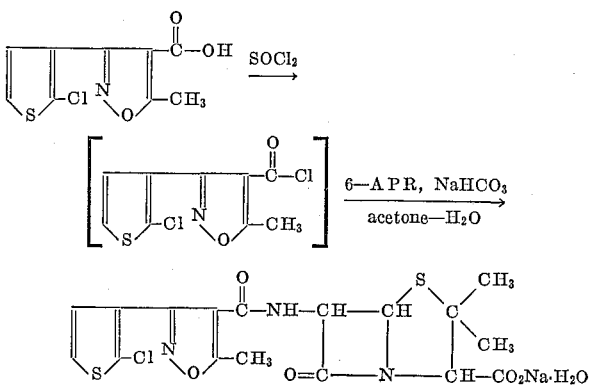

*Procedure.*—To 26.73 g. (0.11 mole) of acid from "(d)" was added 50 ml. of $SOCl_2$ and the mixture warmed at 50–60° C. for 1 hour. The excess $SOCl_2$ was then distilled off and the residue, a brown oil, was dissolved in 100 ml. of cold acetone and added all at once to a previously prepared, vigorously stirred slurry of 21.6 g. (0.1 mole) 6-APA, 34 g. of $NaHCO_3$, 200 ml. of water and 100 ml. of acetone at 10° C. After ½ hour, the ice bath was removed and 1 hour after that 400 ml. of water was added followed by extraction with two 400-ml. portions of ether. The aqueous phase was cooled and acidified to pH 2 with 40% $H_3PO_4$ while under a layer of 400 ml. of MIBK. The MIBK extract was then washed with 2 x 200 ml. portions of water, dried over $Na_2SO_4$ for ½ hour, filtered and treated with 50 ml. of 40% sodium 2-ethylhexanoate in n-butanol. The product crystallized to give 25 g. of sodium salt and was recrystallized from butanol-water to give 18 g. of product. Decomposes at 168–170° C.

*Analysis.*—Calc'd.: C, 42.4; H, 3.56; N, 8.74; (as monohydrate). Found: C, 42.7; H, 3.85; N, 8.69.

This product, which may also be named sodium 5-methyl - 3 - (2'-chloro-3'-thienyl)-4-isoxazolylpenicillin, was found to contain the β-lactam structure by infrared analysis, to inhibit *Staph. aureus* Smith at a concentration of 0.125 mcg./ml. and to inhibit the benzylpenicillin-resistant *Staph. aureus* BX–1633-2 at about 0.2 mcg./ml. (compared to 0.8 for oxacillin) and to inhibit the benzylpenicillin-resistant *Staph. aureus* 52–75 at about 0.2 mcg./ml. (compared to 0.8 for oxacillin). This penicillin is very efficiently absorbed upon oral administration to man and animals. Thus this penicillin exhibited versus *Staph. aureus* BX–1633-2 upon oral administration to mice a $CD_{50}$ of 64 mgm./kg. as compared to a value of 74 obtained with sodium oxacillin.

*Example 3*

(a) 3-chloromethyl-2,5-dichlorothiophene (I).

Reference: C. A. 51: 1935d; "3-Substituted thiophenes," Arkiv Kemi 8, 441–8 (1955).

*Procedure.*—To a stirred and cooled solution of 160 g. (2 moles) of chloromethyl methyl ether, 500 ml. of carbon disulfide and 260 g. (1.7 moles) of 2,5-dichlorothiophene (Aldrich Chemical Company) was added, dropwise, 150 g. of stannic chloride ($SnCl_4$) at 0° C. After 1 hour at 0° C. the mixture was poured onto 2 liters of ice water with vigorous stirring. The organic layer was separated and the aqueous phase extracted with 200 ml. of carbon disulfide and combined with the organic layer. The carbon disulfide solution was washed with three 200 ml. portions of water, dried briefly over sodium sulfate, filtered, and the carbon disulfide removed under reduced pressure. The crude product was used as is for the next experiment.

(b) 2,5-dichloro-3-thiophenecarboxaldehyde (II) and oxime (III).

*Procedure.*—To 300 g. of crude (I) was added 2.2 liters of chloroform and 280 g. (2 moles) of hexamethylenetetramine and the mixture stirred at reflux for 3 hours and allowed to stand 15 hours (overnight) at room temperature (23° C.). The slurry was then filtered, washed with chloroform and air dried to give 430 g. of quaternary salt.

The salt was then steam distilled in 2.5 liters of water and after 6 liters of distillate had been collected they were acidified to pH 2 and extracted with 3 x 300 ml. of ether. The combined ether extracts were dried briefly over sodium sulfate, filtered, and the ether removed under reduced pressure. The yield was 14 g. of crude aldehyde (II). The 14 g. of (II) was heated in 200 ml. of water with 4 g. of NaOH (0.1 mole) and 6.9 g. (0.1 mole) of hydroxylamine hydrochloride on the steam bath with vigorous shaking until a crystalline solid separated. The slurry was cooled, filtered, washed with water, and air dried. The crude oxime was then recrystallized from benzene-"Skellysolve B" (petroleum ether, B.P. 40–60° C.) to give 11 g. of oxime (III), M.P. 129–130° C. The infrared and NMR spectra were consistent with the expected structure.

(c) 3-(2',5'-dichloro-3'-thiophene)-5-methyl-4-isoxazolecarboxylic acid (IV).

*Procedure.*—The oxime from (II), 9.8 g. (0.05 mole), was dissolved in 400 ml. of chloroform and cooled to 5° C. while nitrosyl chloride was bubbled in at a brisk rate for 30 minutes. The dark red solution was allowed to slowly reach room temperature (24° C.) over a 1 hour period and then stirred an additional 1 hour. The excess NOCl and $CHCl_3$ were then removed under reduced pressure and the remaining light yellow oil was dissolved in 50 ml. of cold, dry methanol and added all at once to a previously prepared solution of 2.7 g. (0.05 mole) of sodium methoxide and 6.5 g. (0.05 mole) of ethyl acetoacetate in 50 ml. of methanol at −20° C. with vigorous stirring. The exothermic reaction rapidly reached +5° C. and when the temperature began to fall the ice-salt bath was removed. After 3 hours' stirring, the methanol was removed under reduced pressure and the residue shaken with 300 ml. of ether. The ether extract was washed 3 times with 50 ml. portions of water and the ether was removed under reduced pressure. The residual oil was heated at reflux in 100 ml. H₂O, 4 g. of sodium hydroxide and 200 ml. of methanol for 2 hours. The methanol was then removed in vacuo and 200 ml. of water added. After ether extraction to remove non-acidic materials the aqueous phase was acidified to pH 2 with concentrated HCl with cooling. There was collected 3.9 g. of product IV which was recrystallized from ethanol-water to give 2.9 g., M.P. 174–176° C. The infrared and NMR spectra were consistent with the structure.

*Analysis.*—Calcd. for C₉H₅Cl₂NO₃S: C, 38.9; H, 1.82. Found: C, 39.95; H, 2.22.

(d) Sodium 6-[3-(2′,5′-dichloro-3′-thiophene)-5-methyl-4-isoxazolecarboxamido]penicillanate (V).

*Procedure.*—To 2.46 g. (0.01 mole) of acid IV from "(c)" was added 5 ml. of SOCl₂ (redistilled) and the mixture heated on the steam bath for 1 hour. The excess SOCl₂ was then removed under reduced pressure and the crude acid chloride added in 25 ml. of acetone, all at once, to a vigorously stirred solution of 2.16 g. (0.01 mole) of 6-APA, 3.16 g. (0.04 mole) of sodium bicarbonate, 25 ml. of acetone and 50 ml. of water at 10° C. After ½ hour at 10–15° C. and 1 hour at 20–23° C. the solution was diluted with 100 ml. of water and extracted with two 200 ml. portions of ether. The aqueous phase was then cooled to 5° C. and layered with 100 ml. of ethyl acetate while slowly being acidified to pH 2 with 40% H₃PO₄. The ethyl acetate extract was washed with water and a saturated salt solution, dried briefly over sodium sulfate, filtered, and treated with 5 ml. of 50% sodium 2-ethylhexanoate in n-butanol. The ethyl acetate was then removed under reduced pressure and the resulting oil triturated with dry ether. Upon filtration and vacuum drying there was obtained 3 g. of the penicillin (V) which slowly decomposed at 100° C. The infrared and NMR spectra were consistent with the given structure.

*Analysis.*—Calcd. for C₁₇H₁₄Cl₂N₃O₅S₂Na: C, 41.00; H, 2.84; N, 8.45. Found: C, 40.45; H, 3.18; N, 7.90.

This penicillin may also be named sodium 6-[3-(2′,5′-dichloro-3′-thienyl) - 5-methylisoxazole - 4-carboxamido] penicillanate or sodium 3-(2′,5′-dichloro-3′-thienyl)-5-methyl-4-isoxazolylpenicillin and the corresponding names may be used for the penicillins of the other examples herein. This penicillin inhibited *Staph. aureus* Smith at 0.125 mcg./ml. and *Staph. aureus* BX–1633–2 at 0.4 to 0.8 mcg./ml.

*Example 4*

Replacement in the procedure of Example 1 of the 5-chloro-2-thiophenecarboxaldehyde therein with an equimolar amount of 3,5-dichlorothiophene-2-carboxaldehyde (C.A. 55, 1568c),
4,5-dichlorothiophene-2-carboxaldehyde (C.A. 57, 16527i),
3,4-dichlorothiophene-2-carboxaldehyde (C.A. 32, 3392⁴),
2,4-dichlorothiophene-3-carboxaldehyde and
2,4,5-trichlorothiophene-3-carboxaldehyde (C.A. 57, 16529e), respectively, produces sodium 3-(3′,5′-dichloro-2′-thienyl)-5-methylisoxazolyl penicillin,
sodium 3-(4′,5′-dichloro-2′-thienyl)-5-methylisoxazolyl penicillin,
sodium 3-(3′,4′-dichloro-2′-thienyl)-5-methylisoxazolyl penicillin,
sodium 3-(2′,4′-dichloro-3′-thienyl)-5-methylisoxazolyl penicillin and
sodium 3-(2′,4′,5′-trichloro-3′-thienyl)-5-methylisoxazolyl penicillin, respectively, which are isolated as their water-soluble sodium salts and found to contain the β-lactam structure as shown by infrared analysis and to inhibit Gram-positive bacteria, e.g., *Staph. aureus*, at low concentrations.

*Example 5*

Replacement in the procedure of Example 1 of the ethyl acetoacetate therein with an equimolar amount of ethyl propionylacetate,
ethyl n-butyrylacetate,
ethyl n-valerylacetate and
ethyl n-isovalerylacetate, respectively, followed by completion of the remaining steps in that example produces sodium 3-(5′-chloro-2′-thienyl)-5-ethyl-4-isoxazolyl penicillin,
sodium 3-(5′-chloro-2′-thienyl)-5-n-propyl-4-isoxazolyl penicillin,
sodium 3-(5′-chloro-2′-thienyl)-5-n-butyl-4-isoxazolyl penicillin and
sodium 3-(5′-chloro-2′-thienyl)-5-isobutyl-4-isoxazolyl penicillin, respectively. Each is a water-soluble salt which inhibits Gram-positive bacteria such as *Staph. aureus* at low concentrations.

I claim:
1. The compound of the formula

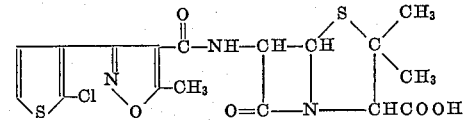

2. The nontoxic, pharmaceutically acceptable salts of the acid of claim 1.

References Cited by the Examiner

UNITED STATES PATENTS

| | | | |
|---|---|---|---|
| 2,996,501 | 8/1961 | Doyle et al. | 260—239.1 |
| 3,132,136 | 5/1964 | Doyle et al. | 260—239.1 |
| 3,174,964 | 3/1965 | Hobbs et al. | 260—239.1 |
| 3,202,653 | 8/1965 | Cheney et al. | 260—239.1 |

FOREIGN PATENTS 905,778  9/1962  Great Britain.

ALEX MAZEL, *Primary Examiner.*

HENRY R. JILES, *Examiner.*

J. W. ADAMS, *Assistant Examiner.*